Aug. 10, 1937.　　　T. J. O'MEARA ET AL　　　2,089,838
ELECTRICAL RELAY
Filed Sept. 11, 1935
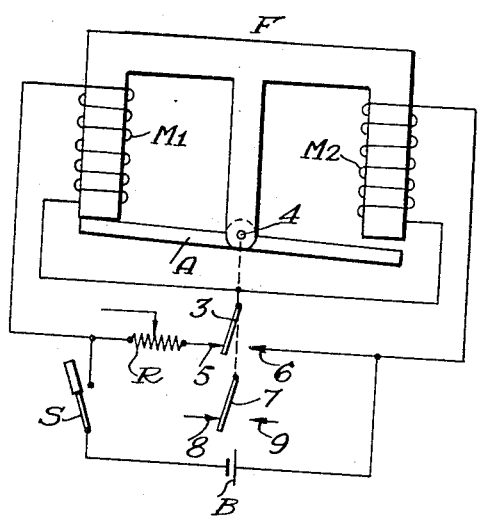
INVENTORS
Thomas J. O'Meara and
Benjamin Mishelevich.
BY
THIER ATTORNEY Patented Aug. 10, 1937

2,089,838

UNITED STATES PATENT OFFICE 2,089,838

ELECTRICAL RELAY

Thomas J. O'Meara and Benjamin Mishelevich, Pittsburgh, Pa., assignors to The Union Switch & Signal Company, Swissvale, Pa., a corporation of Pennsylvania Application September 11, 1935, Serial No. 40,115

7 Claims. (Cl. 175—320)

Our invention relates to electrical relays, and particularly to relays of the type which operate within a definite voltage range; that is, relays which will not operate on any voltage either higher or lower than the limits of this range.

We will describe one form of relay embodying our invention, and will then point out the novel features thereof in claims.

The accompanying drawing is a diagrammatic view illustrating one form of relay embodying our invention.

Referring to the drawing, the reference character F designates in general a relay of the type commonly known as a flasher relay. A relay of this type is disclosed and claimed in Letters Patent of the United States Reissue No. 17,252, granted to C. S. Snavely and W. B. Wells on April 2, 1929 for Electrical relays. As here shown, the relay F comprises a left-hand magnet M1 and a right-hand magnet M2, which magnets may be connected in series through a switch S with a suitable source of current here shown as a battery B. The relay F is provided with an armature A pivotally mounted at the point 4 and normally biased to an initial position as shown in the drawing. Operably connected to, and moving in unison with armature A, are movable contacts 3 and 7. When the armature A occupies its initial or left-hand position so that contact 3—5 is closed, a branch path will be closed across the winding of magnet M1 and when armature A occupies its right-hand position so that contact 3—6 is closed, a branch path will be closed across the winding of magnet M2.

When the switch S is closed, current will flow from battery B through switch S, a variable resistor R, contact 3—5 and magnet M2 back to battery B so that magnet M2 will attract armature A to its right-hand position. When contact 3 comes into engagement with fixed contact 6 so that the branch path is closed across the magnet M2, substantially all of the energy from battery B will flow through magnet M1. When this occurs, armature A will be attracted to its left-hand position. It is readily apparent that armature A will continue to move back and forth between its two extreme positions as long as switch S is closed.

The contact 7 alternately engages with fixed contacts 8 and 9 and may be utilized in any well-known manner for the control of various devices.

We have found that if the branch path across one of the magnets is of a higher resistance than the branch path across the other magnet, the relay F can be made to operate within a definite voltage range. That is, the relay F will be rendered inoperative on voltages higher than a given value as well as on voltages lower than a given value. This characteristic of the relay F is highly desirable since it permits a wider and more economical application of the relay for various purposes. For example, two relays F may be selectively controlled over a single circuit by designing one relay to respond only to a normal operating voltage and the other relay to respond only to a higher operating voltage.

We provide one branch path of high resistance by connecting the resistor R in the branch path across the winding of magnet M1.

It is obvious that by varying the characteristics and/or value of resistor R, the relay F can be made to operate in a number of different ways. For example, if resistor R has a high positive temperature coefficient of resistivity the relay F can be made to continue operation during momentary increases in voltage even though such increases may cause the voltage on the relay to be greater than the predetermined maximum.

Although we have herein shown and described only one form of electrical relay embodying our invention, it is understood that various changes and modifications may be made therein within the scope of the appended claims without departing from the spirit and scope of our invention.

Having thus described our invention, what we claim is:

1. In combination, a relay comprising two magnets, an armature arranged to be moved into one position by the first magnet and into a second position by the second magnet, and means effective when said armature is moved by said first magnet to close an auxiliary path of relatively high resistance across the winding of said first magnet and effective when the armature is moved by the second magnet to close an auxiliary path of relatively low resistance across the winding of said second magnet.

2. In combination, a relay comprising two magnets, a source of current connected with said two magnets, means for alternately closing a path of comparatively high resistance across the winding of one magnet and a path of comparatively low resistance across the winding of the other magnet, and an armature arranged to be moved to and fro by said magnets.

3. In combination, a relay comprising two magnets, an armature controlled by said magnets, a source of current connected with said magnets, a path of high resistance across the winding of one said magnet, a path of low resistance across the winding of the other magnet, and means controlled by said armature for alternately closing said paths.

4. In combination, a relay comprising a movable armature, two magnets arranged when energized to move said armature in opposite directions, means for supplying current to said magnets, and means controlled by said armature for alternately closing a shunt path of high resistance across the winding of one said magnet and a shunt path of low resistance across the winding of the other magnet.

5. In combination, a relay comprising a movable armature, two magnets arranged when energized to move said armature in opposite directions, means for supplying current to said magnets, means controlled by said armature for alternately closing a shunt path of high resistance across the winding of one magnet and a shunt path of low resistance across the winding of the other magnet, and a contact operated by said armature.

6. In combination, a relay comprising two magnets, an armature controlled by said magnets, a source of current connected with said two magnets, two auxiliary paths one across the winding of each magnet, a resistor which changes its resistance in response to a change in the current flowing therethrough and connected in one said auxiliary path, and means controlled by said armature for alternately closing said auxiliary paths.

7. In combination, a relay comprising a movable armature, two magnets arranged when energized to move said armature in opposite directions, means for supplying current to said magnets in series, and means controlled by said armature for alternately closing a path of high resistance across the winding of one magnet and a path of low resistance across the winding of the other magnet.

THOMAS J. O'MEARA.
BENJAMIN MISHELEVICH.